TELEGRAPH REPEATER

Filed Aug. 22, 1956 6 Sheets-Sheet 1

INVENTOR
J. L. HYSKO
BY John E. Cassidy
ATTORNEY

INVENTOR
J. L. HYSKO
BY
John E. Cassidy
ATTORNEY

INVENTOR
J. L. HYSKO
BY John E. Cassidy
ATTORNEY

Aug. 2, 1960 J. L. HYSKO 2,947,816

TELEGRAPH REPEATER

Filed Aug. 22, 1956 6 Sheets-Sheet 4

INVENTOR
J. L. HYSKO
BY John E. Cassidy
ATTORNEY

TELEGRAPH REPEATER

Filed Aug. 22, 1956 6 Sheets-Sheet 5

INVENTOR
J. L. HYSKO
BY
John E. Cassidy
ATTORNEY

Aug. 2, 1960 J. L. HYSKO 2,947,816

TELEGRAPH REPEATER

Filed Aug. 22, 1956 6 Sheets-Sheet 6

INVENTOR
J. L. HYSKO
BY
John E. Cassidy
ATTORNEY

United States Patent Office 2,947,816

Patented Aug. 2, 1960

2,947,816

TELEGRAPH REPEATER

John L. Hysko, Summit, N.J., assignor to Bell Telephone Laboratories, Incorporated, New York, N.Y., a corporation of New York Filed Aug. 22, 1956, Ser. No. 605,622

5 Claims. (Cl. 178—71)

This invention relates to a direct-current, frequency-shift, carrier-current, manual telegraph switching system and particularly to an arrangement wherein a frequency-shift, carrier-current telegraph circuit is terminated at a teletypewriter switchboard and at a subscriber station in direct-current terminations and in which transmission over the line between the switchboard and the subscriber station is on a carrier basis. Such a system is the subject-matter of a patent application, Serial No. 286,998, filed in the names of L. A. Gardner and J. L. Hysko in the United States Patent Office on May 9, 1952, now Patent 2,770,670 issued November 13, 1956, which is hereby incorporated by reference as though fully set forth herein. In that patent an arrangement is disclosed wherein a direct-current subscriber station is interconnected through a frequency-shift carrier terminal located on the subscriber's premises over a carrier facility to a frequency-shift carrier terminal located at a teletypewriter switching station and through a toll subscriber's line circuit to the teletypewriter switchboard. The circuit of the present application differs from the circuit of the patent identified in the foregoing in that it is designed to operate over a facility in which intermediate repeating is required. This is achieved by interconnecting two frequency-shift carrier telegraph channel terminals, resembling the ones located at the subscriber station and at the teletypewriter switchboard in the patent application identified in the foregoing, in a "back-to-back" connection, so that signals may be repeated from one to the other without the use of a direct current magnetic relay repeater. In general, the present "back-to-back" repeaters may be effectively employed at intermediate points for the three following purposes:

(1) To transfer signals from an open wire circuit to a subscriber circuit, where the channels occupy different frequency ranges.

(2) To provide for greater flexibility in routing channels through some intermediate point to any of several different terminations without requiring that the general frequency assignments be the same.

(3) To make possible the transmission of signals over a line facility having a loss exceeding the capability of a single channel.

An object of the invention is the direct interconnection of two frequency-shift carrier telegraph terminating circuits back-to-back, at an intermediate repeating point, without the necessity for interconnecting them through a direct-current telegraph repeater circuit.

Attention is called to the fact that, as heretofore arranged, and as described in the patent application identified in the foregoing, the frequency shift carrier circuit was a terminating circuit, that is to say, it was arranged to be located at one or the other terminal of a telegraph line. It was anticipated that it would be applied on channels which did not require such facilities at intermediate points. The frequency-shift carrier terminals are arranged, on the receiving side, so that they produce direct-current signals which are impressed ordinarily on a co-operating direct-current circuit, such as a direct-current trunk circuit or a direct-current subscriber's loop circuit. It would appear therefore that, in the event that two terminating circuits were required to be interconnected back-to-back at an intermediate point, a direct-current receiving relay, for instance, would be required to receive the direct-current signals, incoming from the receiving branch of the frequency-shift circuit, and to impress them in suitable form on the transmitting branch of the frequency-shift circuit, which is potential controlled. The present invention obviates the need for the direct-current relay repeater at an intermediate point whereat two carrier-current frequency-shift terminating repeaters are connected back-to-back.

The invention may be understood from the following description when read with reference to the associated drawings in which the invention is presently incorporated. It is to be understood, however, that the invention may be incorporated in other forms, which will be suggested from a consideration of the following. In the drawings:

Figs. 1 and 2 taken together, with Fig. 1 disposed to the left of Fig. 2, show the system of the present invention;

Figures 1, 3, 4:
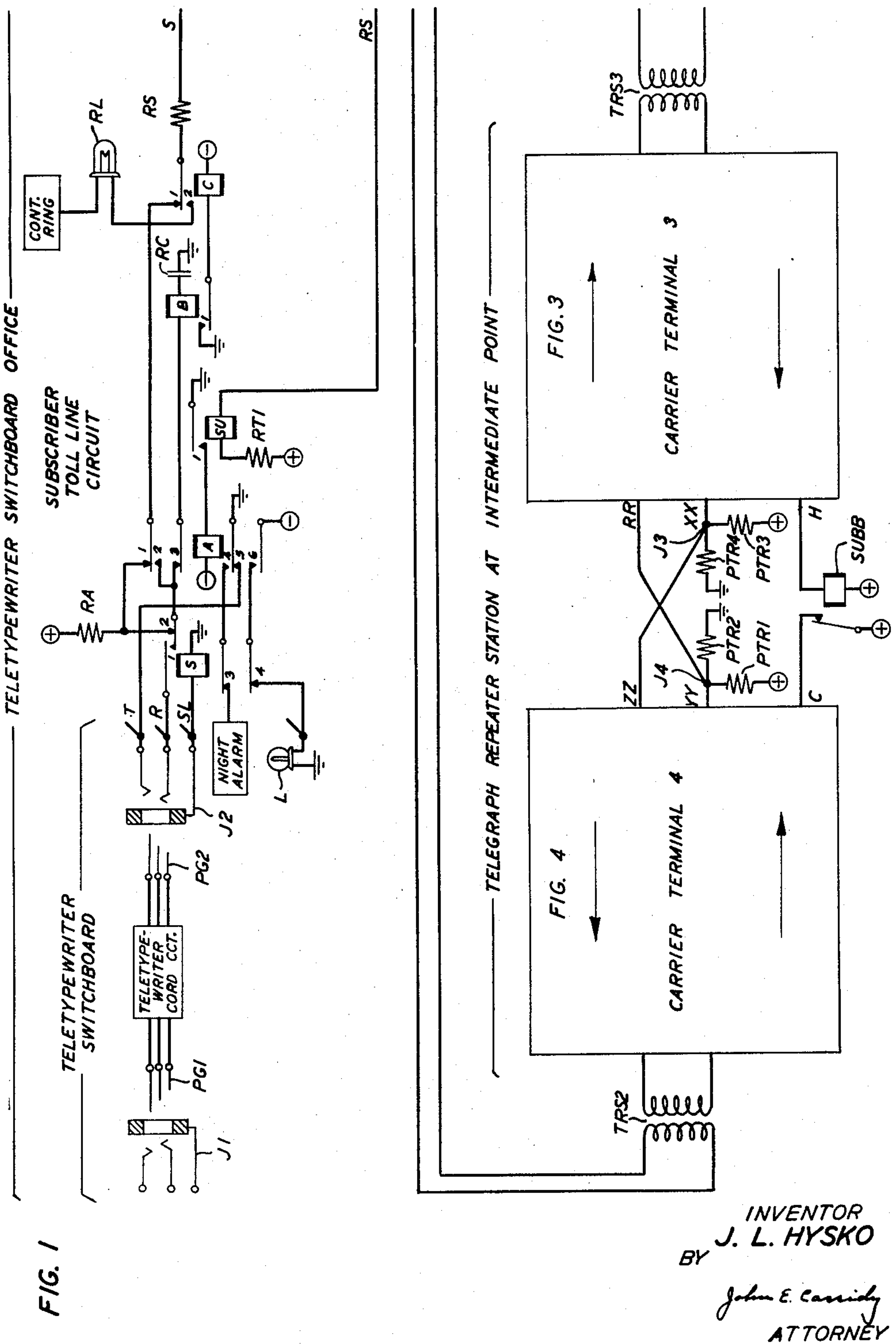
Figs. 3 and 4 show the details of carrier terminals employed in a "back-to-back" connection.
Figures 2, 5, 6:
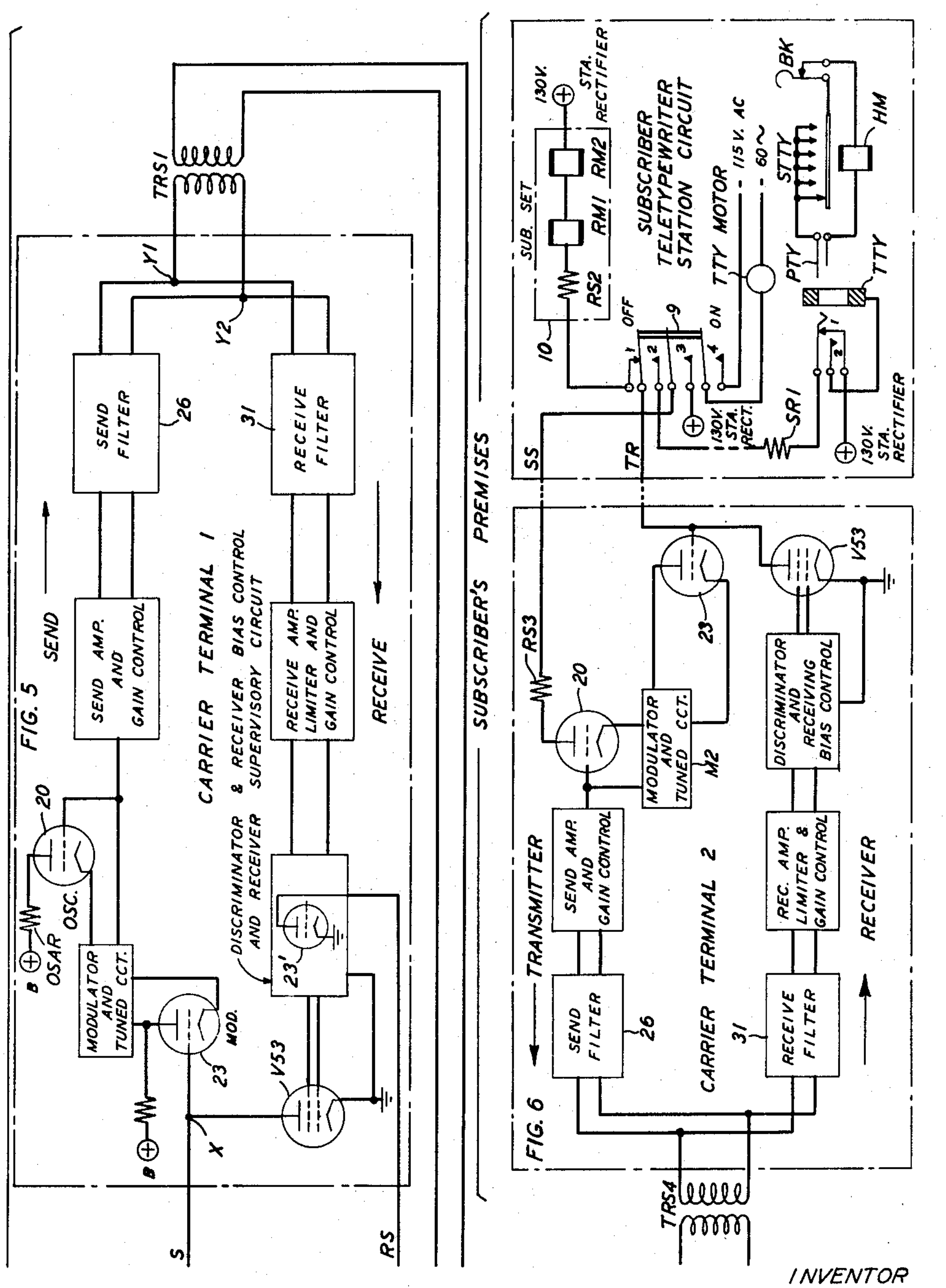
Figs. 5 and 6 show the details of carrier terminals employed at the switchboard and at the subscriber station, respectively.
Figure 3:
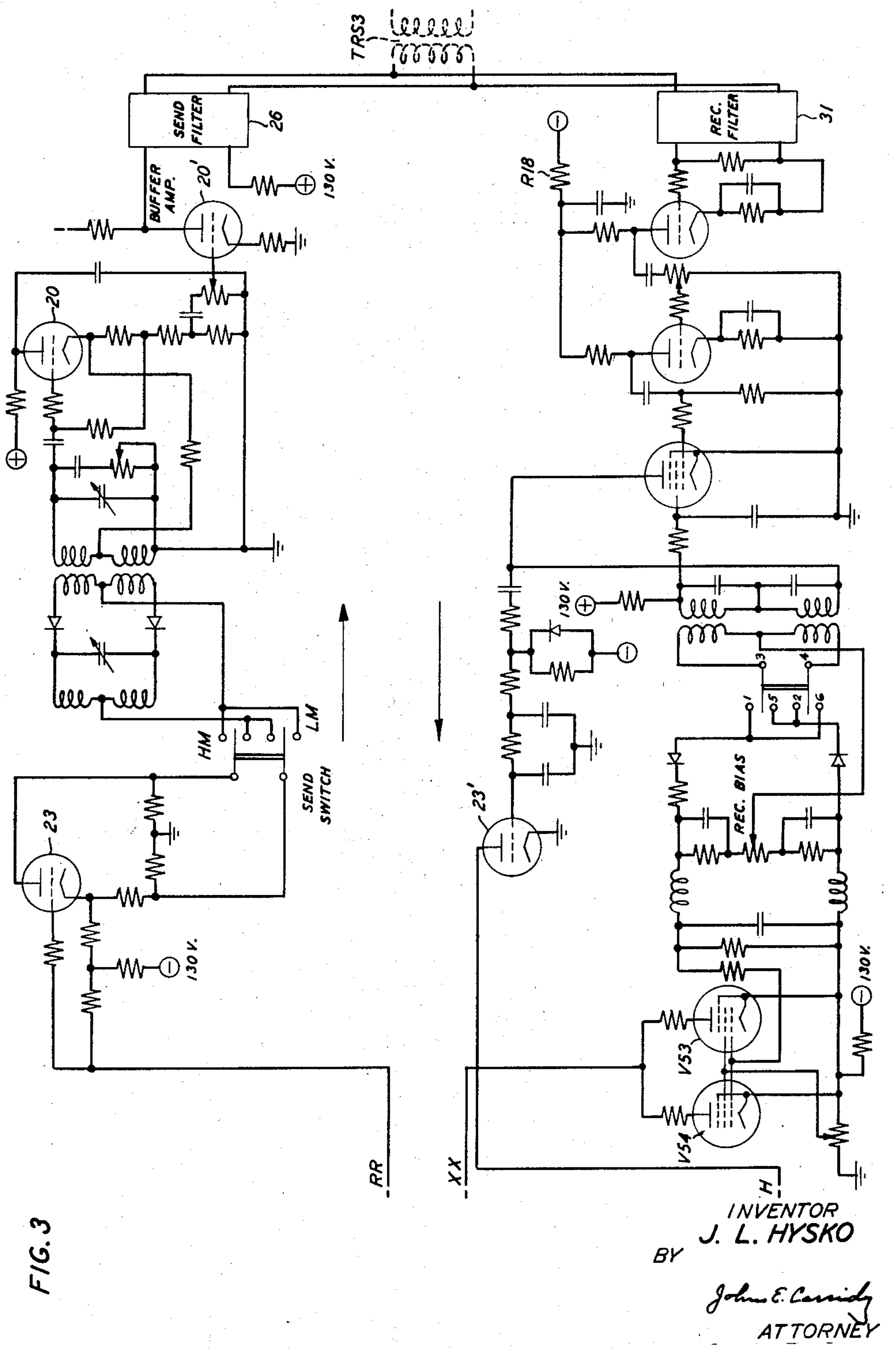
Figure 4:
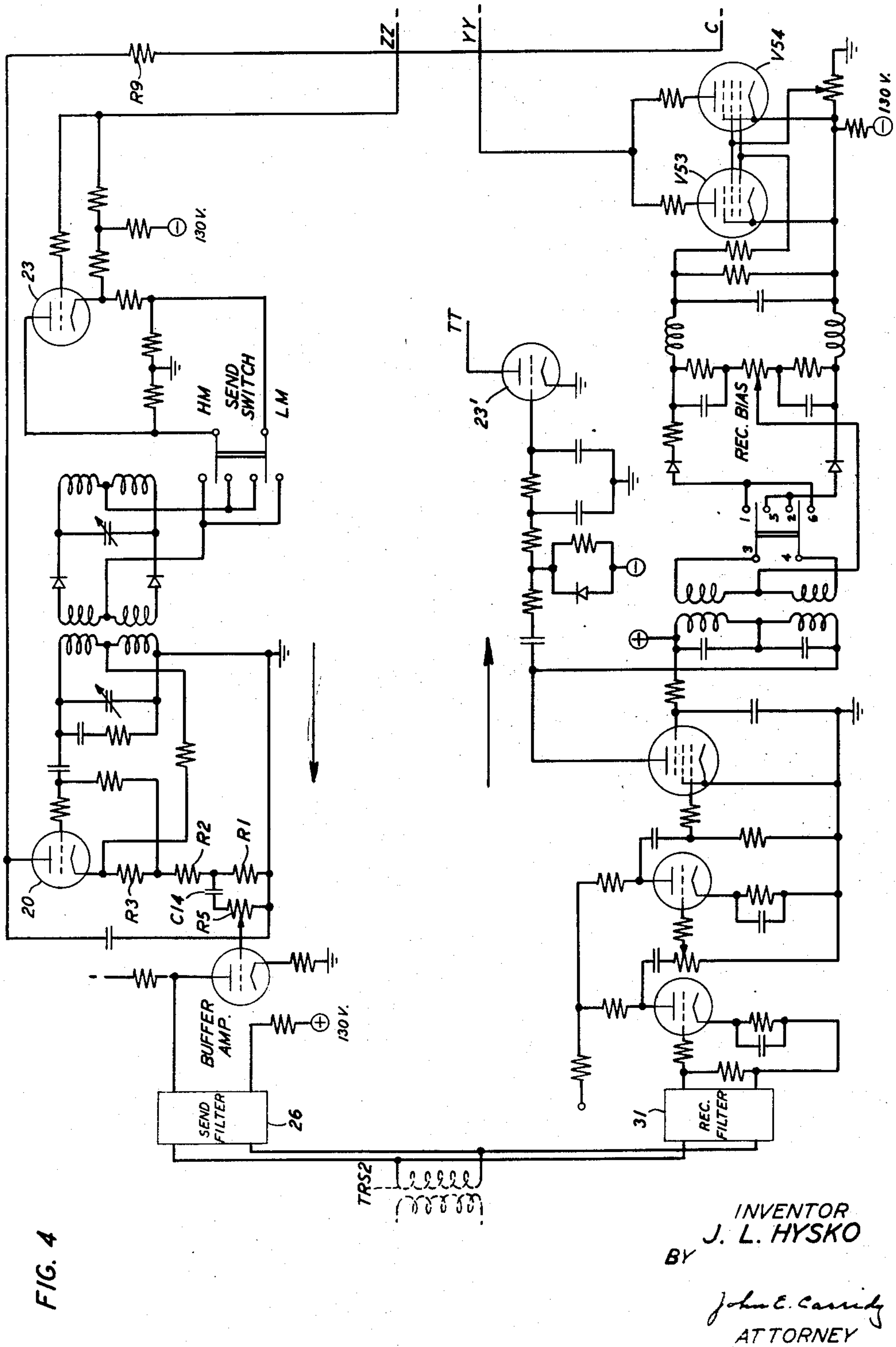
Figure 5:
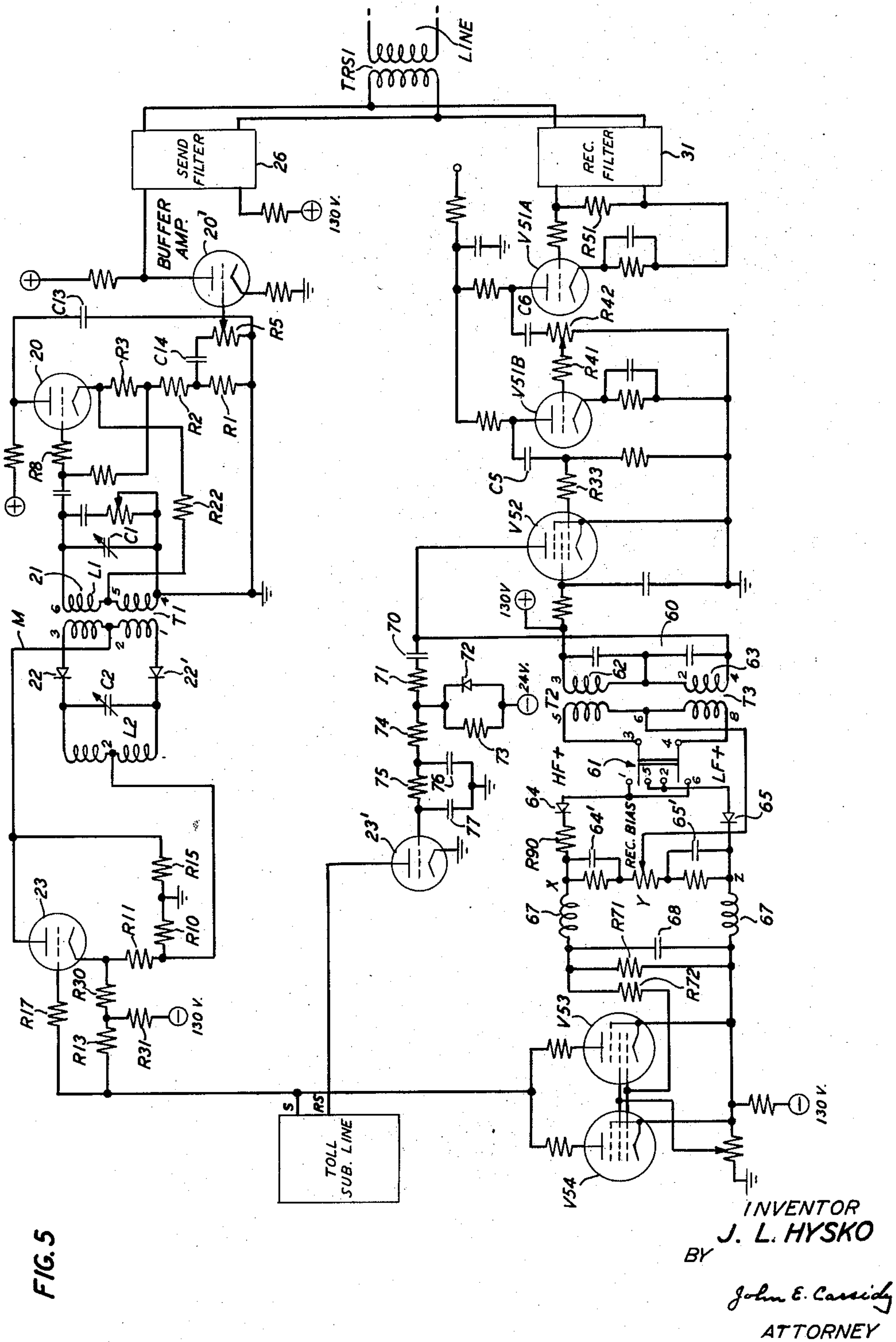
Figure 6:
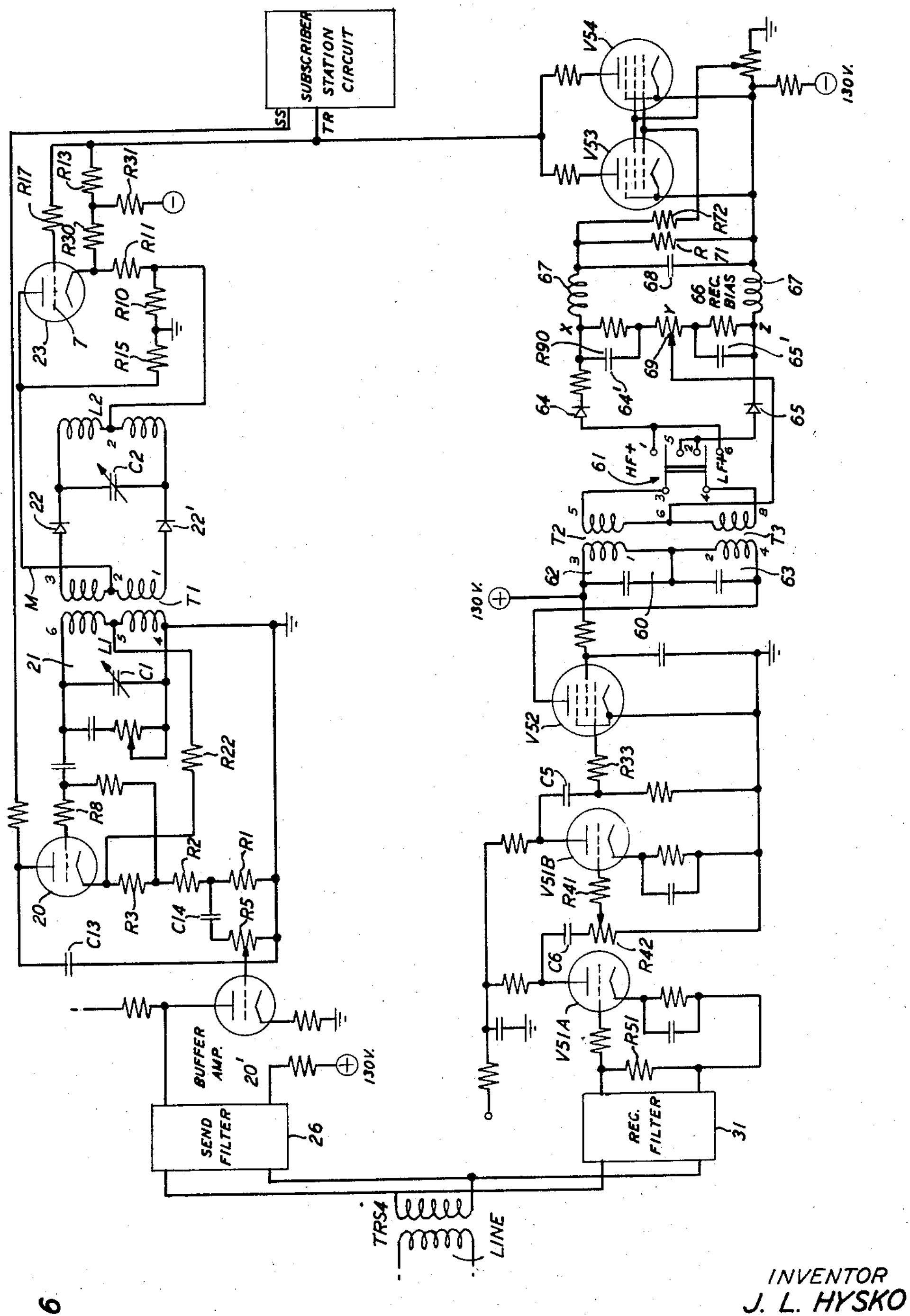

Refer now to Fig. 1 and Fig. 2, with Fig. 1 disposed to the left of Fig. 2. The major units of the systems will first be identified and the manner in which they are interconnected will be described broadly.

At the upper left in Fig. 1 the elements of a teletypewriter switchboard are shown. These comprise a jack J1 which is representative of the terminations of a very large number of circuits in the switchboard to which the present facilities may be connected by means of a teletypewriter cord circuit, which latter is indicated by a captioned rectangle together with plugs PG1 and PG2 and their respective cords. The teletypewriter cord circuit may take a number of different forms dependent upon the subscriber toll line circuit and the other circuits with which it connects. When the subscriber toll line circuit shown in Fig. 1 is employed, the cord circuit of Fig. 3 of Patent No. 1,965,383 granted to C. C. Lane, July 3, 1934, or the cord circuit of Fig. 3 of Patent No. 2,222,672 granted to W. V. K. Large, November 26, 1940, may be employed. Jack J2 and lamp L are the jack and lamp in which the subscriber toll line circuit shown at the upper right in Fig. 1 is terminated at the switchboard. The diagonal spurs connected to the jack J2 and to the lamp L indicate that this jack and lamp are duplicated at other positions in the switchboard.

The subscriber toll line circuit comprises a group of five relays and other incidental apparatus in the upper right-hand portion of Fig. 1. The toll line circuit connects in Fig. 2 to a frequency-shift carrier terminal, Carrier Terminal 1, enclosed within a rectangle, which terminal is in accordance with Fig. 5. Carrier Terminal 1 is assumed to be located adjacent the switchboard and connects to the line through transformer TRS1 shown in the upper right in Fig. 2. The line extends to a remote repeater station, which is intermediate the switchboard and the subscriber station, where it connects through transformer TRS2, shown at the lower left in Fig. 1, to another frequency-shift carrier terminal, Carrier Terminal 4, indicated by a captioned rectangle. This carrier terminal is in accordance with Fig. 4. The latter in turn is interconnected through two potentiometers and a supervisory relay circuit to another frequency-shift carrier terminal, Carrier Terminal 3, represented by another captioned rectangle. Carrier Terminal 3 is in accordance with Fig. 3 and is connected through another transformer TRS3 to a line facility which extends to the subscriber's premises shown in the lower portion of Fig. 2. Here the line connects through transformer TRS4 and another frequency-shift carrier terminal, Carrier Terminal 2, to the subscriber teletypewriter station circuit, shown at the lower right in Fig. 2. Carrier Terminal 2 is in accordance with Fig. 6.

With respect to the drawings, Fig. 1 and Fig. 2 are identical with the arrangement disclosed in the above-identified patent granted to L. A. Gardner and J. L. Hysko except for the Carrier Terminals 3 and 4, shown in the lower portion of Fig. 1, and their interconnections. That is to say, in the arrangement of the patent, the external connection of the carrier terminal such as Carrier Terminal 1, at the teletypewriter switchboard, shown in the upper portion of Fig. 2, is made directly through a line facility to a carrier terminal such as Carrier Terminal 2, located on the subscriber's premises, shown in the bottom portion of Fig. 2 without passing through the two Carrier Terminals 4 and 3 located at the intermediate telegraph repeater station. These two frequency shift carrier terminals, Carrier Terminals 4 and 3 are interconnected in what is known as a "back-to-back" manner. What is meant by this will be described hereinafter.

The present system, it will be observed, in addition to the Carrier Terminals 3 and 4, interconnected back-to-back comprises three major circuit units, namely the frequency-shift carrier terminal circuits, the subscriber toll line circuit and the subscriber station circuit. These are described in the patent identified in the foregoing. However, they will be described here for the convenience of the reader.

Refer now to the subscriber teletypewriter station circuit at the lower right in Fig. 2 the operation of which will now be described in detail. The subscriber station equipment may be arranged for attended or unattended service. The arrangement shown in Fig. 2 is for attended service. In this arrangement when the circuit is idle, as shown, a path may be traced from the grounded cathode of tetrode V53, through the tube to its anode, and conductor TR which is connected through contact 1 of switch 9 to the subset or ringer 10 where it extends through resistor RS2 and the windings of two ringer magnets RM1 and RM2, in series, to positive battery, which may be, for instance, +130 volts.

When the subscriber station is to be called from the switchboard, ringing current is applied at the switchboard in a manner to be described. This current may be 20 cycles, for instance. This is translated in the carrier circuit into transitions between frequencies $f1$ and $f2$ at 20 cycles and responsively into the activation and inactivation of tetrode V53 in Carrier Terminal 2 at 20 cycles. Current no-current pulses at 20 cycles will pass through the ringer magnets RM1 and RM2 in the subset 10, to operate the ringer.

When the subscriber station is in the idle condition as shown, a circuit may be traced from ground, not shown, in the modulator and tuned circuits through the cathode-anode path of oscillator 20, resistor RS3 and conductor SS to contact 3 of switch 9 which is open for the idle condition of the subscriber station. During the idle condition, therefore, no oscillations will be produced in the oscillator circuit of Carrier Terminal 2 and no signals will be transmitted through the send amplifier and gain control, the send filter 26 and transformer TRS4 to the line. This, as will be made clear hereinafter, produces the third or no-carrier signaling condition employed for calling and supervisory purposes.

After the subscriber station has been turned over to the customer for service, the teletypewriter circuit plug PTY is connected at all times to the teletypewriter jack TTY. The teletypewriter motor which drives the teletypewriter is not energized since its energizing circuit, which may, for instance, be 115-volt alternating current, is open at contact 4 of key 9.

In response to the ringing of the station, the attendant actuates switch 9 to its lower position closing contact 4 and energizing the teletypewriter motor. When switch 9 is actuated to its lower position, contact 1 is opened disconnecting the subset or ringer 10. Contact 3 is closed which connects positive battery, such as positive 130 volts, through resistor RS3 to the anode of oscillator 20. Contact 2 of switch 9 is closed which connects lead TR through resistor SR1 and either through contact 1 of jack TTY to positive battery which may be, for instance, positive 130 volts, or through the teletypewriter cord circuit, when the cord is connected to the TTY jack. Under this condition, contact 1 of jack TTY is open, its contact 2 is closed and the circuit is extended through the tip of jack TTY, tip of plug PTY, teletypewriter transmitting contacts STTY, contacts of break key BK, winding of selector hold magnet HM, sleeve of plug PTY, sleeve of jack TTY, and contact 2 of jack TTY to the same positive battery. The anode of tetrode V53 and the grid of modulator drive triode 23 are connected in parallel.

After the operation of switch 9, permutation code signal combinations, comprised of signal elements $f1$ and $f2$, defining letter, number and other teletypewriter characters and other combinations which control the teletypewriter in performing functions such as spacing, line feed carriage return, etc., may be transmitted from the switchboard and impressed on the selector magnet HM of the teletypewriter at the subscriber station, which will responsively type the character or perform the function. This will be made clear hereinafter.

In transmitting from the subscriber station toward the switchboard the station attendant will operate the teletypewriter keys to actuate the teletypewriter transmitting sending contacts STTY. As the contacts are actuated the path through the teletypewriter cord circuit will be opened and closed. During the closed interval, current will flow through the teletypewriter and the anode-cathode path of tetrode V53. During the contacts open periods, no current will flow. The potential impressed on the input of the modulator drive tube 23 will responsively change so that it conducts for the closed or marking condition and is cut off for the open or spacing condition. To anticipate the detailed description of the carrier terminals and of subscriber toll line circuit, to follow hereinafter, impedance units in the tuned circuits will be responsively switched to produce alternating currents of $f1$ and $f2$ which are transmitted through the send amplifier, the send filter, line transformer TRS4 and over the line to the distant station. Assuming for the present that this is the distant teletypewriter switchboard station, the signals are passed directly into the receiving branch of the carrier circuit of Carrier Terminal 1 and through the receive filter, the receive amplifier limiter and gain control, the discriminator and receive bias control, tetrode V53 and finally through conductor S into the toll subscriber line circuit. Supervisory signals are transmitted from the subscriber station under control of switch 9, which switch produces the no-carrier condition when in its upper position and marking carrier $f1$ when in its lower position. These signals pass through a triode 23′ in the receive amplifier, limiter, discriminator and gain control in Carrier Terminal 1 and are impressed through conductor RS on the toll subscriber line circuit to control the line lamp L or to impress conditions through the contacts of jack J2 to operate supervisory signal controls, such as recall and disconnect signal controls, in the connected cord.

Preliminary to a description of how the carrier terminals function in a back-to-back connection, the manner in which two such terminals function in a system in which they are interconnected directly without passing through a back-to-back connection will be described. Such a system would involve the direct connection of Carrier Terminal 1 to Carrier Terminal 2.

Refer now to Figs. 5 and 6 with Fig. 5 to the left of Fig. 6. In Fig. 5, the toll subscriber line circuit, shown in detail at the upper right in Fig. 1 is indicated by a rectangle at the left. It is connected through the sending and receiving branches of the carrier circuit shown at the top and bottom of Fig. 5 respectively, through transformer TRS1, and the line into Fig. 6, through transformer TRS4 and the sending and receiving branches of the carrier terminal at the subscriber station to the subscriber station circuit indicated by a rectangle at the right of Fig. 5.

Refer now to Fig. 5. The carrier telegraph transmitter comprises an oscillator 20 having a tuned circuit 21 in its feedback path. The tuned circuit 21 is tunable to two discrete frequencies $f1$ and $f2$, termed the normal and shifted frequency, respectively. The oscillator 20 generates the normal frequency $f1$ determined by variable capacitor C1 and the primary coil L1 of transformer T1, which frequency represents the marking condition. For spacing, the frequency of the oscillator is shifted to $f2$ by the coupling of additional reactance L2—C2 into the tuned circuit. The switching of the added reactance is under the control of the varistors 22, 22', whose impedance, high or low, is determined by a bias direct-current voltage on lead M.

The oscillator tube 20, which may be half of a twin triode vacuum tube, furnishes the necessary feedback gain to maintain oscillations. The other half of the twin triode, namely tube 20', constitutes a buffer amplifier between the oscillator 20 and the line. The output from the oscillator tube 20 supplies feedback to its frequency determining tuned circuits 21 through resistor R22 and winding 5—4 of input transformer T1. Resistor R8 serves to suppress parasitic oscillations.

The oscillating voltage which appears between winding 6—5 of transformer T1 is applied between the grid and cathode of tube 20, causing a current of the same frequency to circulate through the cathode-plate circuit of this tube, which includes condenser C13 and a group of resistances R1, R2 and R3 in series with the cathode. The drop in the group of resistances R1, R2 and R3 is applied to winding 4—5 of transformer T1 which furnishes the necessary coupling between the cathode and grid to sustain oscillations. The grid of tube 20 is suitably biased by the direct-current component of the cathode current through resistor R3.

For the marking condition, the varistors 22 and 22' are non-conducting or biased to provide a very high impedance, thereby rendering the secondary of transformer T1 ineffective and isolating the additional reactance L2—C2, so that the tuned circuit resonates at the marking frequency $$f1=\frac{1}{2\pi\sqrt{L_1C_1}}$$

For the spacing condition, the varistors conduct and the oscillator frequency is shifted to the spacing frequency $f2$ by the coupling of added reactance L2—C2 in parallel into the tuned primary of transformer T1.

The switching of the additional reactance into the tuned circuit 21 is accomplished by biasing varistors 22 and 22' to a low impedance value by means of the appropriate direct-current bias. If the net added reactance is capacitive the frequency is shifted to a lower value. If inductive, the frequency is shifted to a higher value.

The varistors 22 and 22' function as series switches under the control of modulator tube 23, which may be half of a twin triode vacuum tube, the other half of which may be triode 23'. The grid of tube 23 is driven by the signals originated in the toll subscriber line circuit in a manner to be described hereinafter. Modulator tube 23 is thus caused to conduct for an outgoing marking signal and to cut off for an outgoing spacing signal.

When modulator tube 23 is conducting, resistor R15 and the plate to cathode path of tube 23 connected in series are shunted by resistors R10 and R11. This condition produces a potential at the plate of tube 23 which is negative with respect to the potential at the junction of resistors R10 and R11. This negative potential is impressed between terminal 2 of transformer T1 and terminal 2 of inductance coil L2 and is thus impressed across varistors 22 and 22' in the non-conducting direction.

For the spacing condition, the tube 23 is cut off and a current flows from negative 130-volt battery, for instance, through resistor R31, resistor R30, resistor R11, terminal 2 of inductance coil L2, through the top and bottom windings of inductance coil L2 in parallel, varistors 22 and 22' in parallel, windings 1—2 and windings 2—3 of transformer T1 in parallel, conductor M and resistor R15 to ground. The path from the top terminal of resistor R11 to ground, as just traced, is shunted by resistor R10. Varistors 22 and 22' are at their low impedance for this condition. As a result of this the secondary of input transformer T1 is effectively coupled to the reactance of inductance coil L2 and capacitor C2. This changes the tuning of the oscillator circuit which responsively generates alternating current at frequency $f2$. Since the voltage and current for controlling the impedance of the varistor units is fed into center taps 2, 2 of the input transformer secondary and of the inductance coil L2, respectively, no disturbing transients are coupled into the oscillator tuned circuit.

The marking frequency $f1$ and the spacing frequency $f2$ from the oscillator are passed into the capacitor C14 and through the variable resistor R5 into the buffer amplifier 20', thence through sending filter 26 and transformer TRS1 over the line to the distant subscriber station. The sending filter 26 is tuned to the mid-frequency of a frequency band between $f1$ and $f2$.

Thus, signals are formed by shifting the carrier oscillator frequency between values $f1$ and $f2$ which are equal amounts above and below the nominal mid-band of the sending and receiving filters.

Refer now to Fig. 6. The received signals pass through transformer TRS4 of Fig. 6 and are selected by an appropriate receiving filter 31 which accepts a narrow band of frequencies centered about the marking and spacing frequencies $f1$ and $f2$ of the channel to be received. Like the sending filter of Fig. 5 the receiving filter 31 of Fig. 6 provides an impedance transforming structure presenting 600 ohms toward the line and approximately 140,000 ohms toward the grid cathode circuit of the first amplifier stage V51A. Tubes V51A, V51B and V52 form an amplifier limiter so that the output of tube V52 remains constant for wide variations of received level. When the received level is low, tube V52 does all of the limiting. The 1-megohm resistor R33 in series with its grid prevents the grid from going positive and so confines swings in plate current to the range from 0 to about 10 milliamperes. The output therefore is substantially constant for any signal level at the input of the received filter 31 not exceeding about minus 50 decibels with respect to one milliwatt. When this level is so high that grid current tends to flow in tubes V51A and V51B, these tubes also contribute to the limiting action due to the resistance in the grid circuits. Large carrier amplitudes are limited by tube V51A and small amplitudes are limited by tube V51B and/or tube V52.

The resistor R42 constitutes a gain control which is connected between the plate of tube V51A and the grid of tube V51B. It provides the means for adjusting the gain of the limiter-amplifier aforementioned. The series grid resistor R41 serves to limit the positive grid swing for large signals and minimizes the amount of self-bias developed across coupling capacitor C6. This arrangement gives substantially symmetrical limiting of the carrier frequency wave form.

The output from the plate of tube V51B is coupled to the grid of pentode tube V52. The series grid resistor R33 limits the positive grid swing and minimizes the amount of self-bias across coupling capacitor C5 due to grid rectification.

The plate current of tube V52 passes through the primary side of the discriminator circuit 60. The discriminator consists of two anti-resonant circuits 62 and 63 in series which are tuned respectively to somewhat higher and lower frequencies than *f*1 and *f*2, the mark and space frequencies, respectively. The coils of the two tuned circuits 62 and 63 are the primaries of the two independent one-to-one ratio transformers T2 and T3, one primary being tuned to parallel resonance at the high frequency edge of the channel band, and the other being tuned to parallel resonance at the low frequency edge of the channel band. The secondary windings of transformers T2 and T3 are connected in series. Reversing switch 61 provides means for reversing the output connections from the discriminator network.

When the discriminator switch is operated to the HF+ position, the higher frequency is rectified by rectifier 64 and the lower by rectifier 65, resulting in direct-current voltages appearing across points XY and YZ, respectively. At the mid-band frequency the two voltage outputs are balanced giving zero output. When the higher frequency is being received its voltage is dominant and when the lower frequency signal is being received its voltage, that is the direct-current voltage produced by it, is dominant. It follows that when the higher frequency is received, voltage XY predominates and the grids of tubes V53 and V54 are positive with respect to their cathodes, and when voltage ZY is the larger they are negative. Capacitors 64' and 65', respectively, form a by-pass for the carrier currents.

The function of the limiter is apparent, for since the discriminator would translate either changes in frequency or changes in magnitude appearing at its input into corresponding voltage variations across terminal XY and terminal YZ, it is necessary that magnitude changes be first eliminated by the limiting action of the preceding vacuum tube stages. With the arrangement employed, tube V52 generates a plate-to-cathode alternating-current voltage which is independent of signal magnitude or frequency but this voltage, or the greater part of it, is alternately shifted between the input terminals 3—1 and 2—4 of the discriminator transformer, depending on whether a marking or spacing frequency is received. Fundamentally, the limiting action is secured by producing an amount of amplification in tubes V51A and V51B which is far in excess of that required to obtain the needed voltage across terminal XY and terminal YZ and then severely curbing the magnitude of their outputs. Due to this action, variations in level change affect equally the marking and spacing frequencies and cause no signal distortion. In other words, frequency-shift operation gives extremely effective level compensation.

The rectified signals are passed through the low-pass filter 66 consisting of inductance coils 67 and condenser 68. The low-pass filter has a cut-off frequency near 40 cycles and serves to remove carrier ripple and to attenuate interference arising from extraneous frequency components differing from the carrier frequency by more than 40 cycles. A balanced low-pass filter structure without mutual inductance is used in order to present high and nearly equal impedance to ground. This prevents a change in the tuning of the discriminator when reversing switch 61 is operated for reversing connections from the discriminator. A positive or negative output may thereby be obtained by the marking condition. The discriminator switch 61 also permits normal operation with a reversal of the mark and space frequency assignments if desired.

The output of the low-pass filter is terminated by resistor R71 and is applied through grid-limiting resistor R72 to the grids of output tubes V53 and V54. In order to center the demodulated signals on the grid characteristic of tubes V53 and V54 and thus avoid biased signals, the mean of the mark and space output voltages from the low-pass filter must be a few volts negative with respect to the cathodes of tubes V53 and V54. This is accomplished by adjustment of the potentiometer 69, by which the positive output condition may be made to be of less amplitude than the negative output condition. The potentiometer 69 also provides means for compensating for discrepancies in the discriminator and deviations in the marking and spacing frequencies from their theoretical values, also for other biases which may originate in the sending terminal.

Tubes V53 and V54 therefore act in unison as a single switch whose closing is controlled by positive signals across terminals XZ and whose opening is effected by negative signals across the same points, that is, they are equivalent to a receiving relay operated by polar signals.

When signals are received this "switch" closes the circuit through the TR lead into the subscriber station circuit permitting current from plus 130-volt battery, for instance, to flow through the connected circuit to the anodes of tubes V53 and V54 and through the tubes to their grounded cathodes as a marking signal. When the "switch" opens under the influence of a negative voltage this current is broken and a spacing signal is produced in the connected circuit.

Attention is particularly called to the fact that the grids of tubes V53 and V54, Fig. 6, are connected through resistor R71 to the cathodes of these tubes. Hence when no carrier is being received from the distant switchboard, since the grids and cathodes of these tubes are at the same potential and since lead TR is terminated in positive battery in the connected subscriber station circuit, current will flow through the anode-cathode circuits of the tubes to hold the connected circuit in the marking condition. This is known as the mark-hold feature. Reference to Fig. 5 shows that the arrangement of tubes V53 and V54 at the teletypewriter switchboard is the same as at the opposite terminal connected to the subscriber station. In this case when no carrier is being received at the subscriber station, current will flow from positive 130-volt battery connected to lead S in the connected circuit through the anode-cathode of the tube to ground holding the connected circuit in the marking condition.

When the higher channel frequency is employed for spacing instead of marking, the left-hand part of the oscillating circuit of Fig. 5 is made inductive instead of capacitive and the discriminator switch 61 is operated to LF+. This impresses the lower frequency through rectifier 64 and the resulting rectified voltage appears between points XY.

When signals are being transmitted from the switchboard, the subscriber station, Fig. 6, is normally transmitting a steady marking signal, so that the grids of tubes V53 and V54 in Fig. 5 are kept continually positive. These tubes will therefore conduct when a marking signal is transmitted from the switchboard by closing the circuit through conductor S, and will be nonconducting when a space is transmitted by opening the path through conductor S. During the mark, grid 7 of tube 23 in Fig. 5 is positive with respect to its cathode, causing this tube to become conducting and to send out a marking signal over the carrier line to the distant subscriber station. During a spacing signal the voltage at grid 7 of tube 23, Fig. 5, which is connected to —130 volts, for instance, through resistors R31 and R13, falls to —130 volts, tube 23 becomes nonconducting and spacing carrier is transmitted as previously described.

When mark and space signals are being received from the distant subscriber station the path through conductor S, in Fig. 5, is normally in the closed condition. During the reception of a marking signal from the distant subscriber's station a positive voltage is applied to the grids of tubes V53 and V54, these tubes conduct and current flows in conductor S. This results in a voltage, applied to the grid of tube 23, in Fig. 5, which is positive with respect to its cathode and marking frequency +1 is transmitted over the carrier channel as described above to the distant subscriber station. When a spacing carrier signal is received by Fig. 5 from the distant subscriber station, a negative voltage is applied to the grids of tubes V53 and V54. This reduces the current in conductor S, in Fig. 5, to nearly zero. The potential at the plates of tubes V53 and V54 rises to +130 volts for this condition due to the battery not shown in Fig. 5 but apparent in Fig. 1, at the end of conductor S. Thus the voltage applied to the grids of tube 23, Fig. 5, becomes even more positive and tube 23 remains conducting so that an outgoing marking condition is sustained. In summation, therefore, tube 23 of Fig. 5 cuts off for a spacing signal from the switchboard through conductor S, conducts for a marking signal from the switchboard through conductor S, and remains conducting when a marking signal is received from the subscriber's station as well as when a spacing signal is received from the subscriber's station.

The resistor R13 shown in Fig. 5 is effective in transmitting a break signal from the switchboard to the distant subscriber's station. When conductor S is open to transmit a break signal from the switchboard to the distant subscriber station, resistor 13 acts to insure that a spacing potential is applied to grid of modulator tube 23 in Fig. 5 during intervals when a spacing signal is being received from the subscriber's station and tubes V53 and V54, in Fig. 5, are responsively cut off.

Normally battery is disconnected, as described, from the plate of oscillator tube 20 at the subscriber's station, when the station is idle and switch 9 at the station is in its upper position. When switch 9 is actuated to its lower position, battery is connected to the anode of the oscillator tube 20, as also described, and marking carrier *f*1 is transmitted to the teletypewriter switchboard. Switch 9 is actuated in order to operate the subscriber's line lamp at the teletypewriter switchboard. The manner in which the receiving branch of the carrier circuit in Fig. 5 functions to impose a condition on conductor RS so as to actuate the toll subscriber line circuit to light the lamp will now be described.

In response to the transmission of marking carrier *f*1, when switch 9 is actuated at the subscriber station, the carrier signal will be transmitted from Fig. 6, passed by receiving filter 31 in Fig. 5, tubes V51A and V51B and imposed on the input of tube V52 in Fig. 5, resulting in an alternating-current flow from the plate of tube V52 through blocking condenser 70, resistor 71 and the parallel combination of resistor 73 and varistor 72 to the negative terminal of the filament battery, thence to ground and finally back to the cathode of tube V52. The rectifying action of varistor 72 sets up a direct-current voltage across resistor 73 which opposes the negative 24-volt bias on the grid of tube 23'. The low-pass R–C filter comprising resistor 75 and capacitances 76 and 77 shown in the grid circuit of tube 23' removes the carrier and provides a delay in the build-up of the direct-current grid voltage on tube 23'. Grid current flow in tube 23' limits the voltage between grid and cathode to zero. When the rectified voltage across resistor 73 is equal to or greater than the −24 volt bias, tube 23' conducts, since conductor RS is terminated in positive 130-volt battery in the toll subscriber line circuit. Conductor RS extends through the winding of the supervisory relay SU in the toll subscriber line circuit which controls the line lamp and performs other supervisory function in a manner to be described. When the carrier for the supervisory signal is applied to the input of receiving filter 31 at normal level, plate current does not flow for about 150 milliseconds, but when the carrier input stops, the current flowing in the output circuit of tube 23 through conductor RS falls to zero in about 50 milliseconds. The longer delay insures against false operation of the supervisory relay due to bursts of noise, while the shorter delay provides a relatively fast disconnect signal when the distant subscriber opens his power switch.

Refer now to the subscriber toll line circuit in Fig. 1. Conductors S and RS are shown extending into the toll subscriber line circuit from Carrier Terminal 1. During the idle condition the transmission lead S from the carrier channel terminal is connected through resistor RS, back contact 1 of relay C, back contact 1 of relay A and resistor RA to positive telegraph battery, which may be, for instance, 48 volts. Current which may be, for instance, 20 milliamperes, will flow in lead S and the carrier channel terminal responsively will send out marking current to the line over the transmitting branch of the carrier circuit to the distant subscriber station. No current will flow in the supervisory conductor RS and no relays in the subscriber toll line circuit will be operated. It will now be assumed that the subscriber at the distant subscriber station calls the switchboard by operating power switch 9 at the subscriber station. As a result of this, carrier current will be received through the receiving branch of the carrier circuit of Carrier Terminal 1. As a result of this, triode 23' becomes conducting. Current will therefore flow from the positive telegraph battery which may be, for instance, 130 volts in the subscriber toll line circuit, through resistor RT1, winding of supervisory relay SU, lead RS, anode of triode 23' and to its cathode to ground operating relay SU. This current may be 10 to 15 milliamperes, for instance, but its value is not critical. The operation of relay SU establishes a circuit from ground through contact 1 of relay SU and the winding of relay A to battery operating relay A. The operation of relay A will perform five functions as follows:

(1) It transfers conductor S from contact 1 of relay A to contact 2 of relay A. Positive battery will, however, continue to be supplied to conductor S over a path through resistor RA, contact 2 of relay S and contact 2 of relay A, so that positive battery will remain connected to the conductor as in the idle condition.

(2) The operation of relay A, by opening its contact 3, will disconnect the winding of relay B from a path which is connectable to the ring conductor R of jack J2.

(3) The operation of relay A, by opening its contact 5, will disconnect ground from the tip conductor T of jack J2.

(4) The operation of relay A will connect ground through its contact 4 and contact 3 of relay S, which relay is unoperated, to the night alarm circuit. If a switch, not shown, in the night alarm circuit is in the operate position, the night alarm circuit will be operated.

(5) The operation of relay A will close a circuit from battery through its contact 6, contact 4 of relay S and the filament of line lamp L to ground, lighting the lamp as an indication that the distant subscriber is calling.

The circuit is now ready for the connection of the plug PG2 of an answering cord to jack J2.

If the subscriber at the distant subscriber station restores power switch 9 to its off or idle position and then reoperates it before the operator at the teletypewriter switchboard answers the call, first relays SU and A will release in sequence and the subscriber line lamp L at the switchboard will be extinguished in response to the restoration of the power switch to normal. Then relays SU and A will be reoperated and lamp L will be relighted, thus following the operation of the power switch.

If the subscriber at the distant subscriber station abandons the call by simply restoring the power switch to its off or idle position before the operator at the switchboard answers, relays SU and A will release, the answering lamp L will be extinguished and the night alarm will be restored to the idle condition. Thus the subscriber toll line circuit will be restored to the idle condition.

The operator at the teletypewriter switchboard answers an incoming call by inserting plug PG2 of an answering cord in the line jack J2. The operation of the jack springs will perform three functions as follows:

(1) The operation of the jack springs will establish a circuit from battery, not shown, in the cord through the sleeve of plug PG2, sleeve of jack J2, lead SL and the winding of relay S to ground operating relay S. It will also operate relays, not shown, in the connected cord circuit to set up a transmission path in the cord.

(2) The operation of relay S by opening its contact 4 will extinguish subscriber line lamp L.

(3) The operation of relay S, by closing its contact 1 and opening its contact 2, will transfer the transmission lead from positive telegraph battery through resistor RA to positive telegraph battery of the same potential, not shown, in the cord through the ring lead R of the jack and the connected ring lead of the cord. The operator's teletypewriter set will be included in this path if the typing key of the cord circuit is operated. This path was established by the operation of relays in the cord circuit when the sleeve lead of the cord circuit was connected, as described under function 1 of this section. Other circuit functions in the cord circuit prevent interference as two operators answer the same incoming call. Attention is particularly called to the fact that the operation of the cord circuit is described in detail in patents identified in the foregoing.

The operator may now operate the typing key in the cord circuit and communicate with the subscriber at the distant subscriber station. Keyboard operation of the operator's teletypewriter will open and close the path through conductor S which will cause alternate spacing and marking carrier current to flow in the line to the subscriber. The same operation will take place in the reverse direction from the subscriber to the operator.

The subscriber at the distant subscriber station may recall the operator after the operator's connection to the line jack has been made by restoring power switch 9 at the subscriber station to its off or normal idle position and then again reoperating it.

The operation of the power switch 9 to its off or normal idle position will interrupt the flow of current in conductor RS. This will release relays SU and A, leaving relay S operated, as it is assumed that the operator's cord circuit remains connected to jack J2. The tip lead T of the cord circuit will be connected to ground through contact 5 of relay A. This causes a relay in the cord circuit to operate which lights the cord answering supervisory lamp, and prepares the cord for subsequent functions when ground is disconnected from the tip lead.

The operation of power switch 9 to its operated position will cause current to flow again in conductor RS. This will reoperate relays SU and A. This will reconnect the ring conductor R of the cord circuit to the transmission lead S at contact 2 of relay A. It will also open the tip lead of the cord circuit by opening contact 5 of relay A. As a consequence of this, the release of a relay in the cord circuit will connect interrupted ground to the cord lamp, not shown, causing it to flash as a recall signal, to indicate that the distant subscriber is recalling the operator at the switchboard. The switchboard operator may extinguish the flashing cord lamp and reply to the subscriber's recall signal by operating the typing key in the cord circuit. This will reconnect the operator's teletypewriter in the path of the ring lead of the cord circuit and the flashing of the cord circuit lamp will cease. The switchboard operator may complete the call by connecting her calling plug PG1 to the proper jack J1, after securing the necessary information from the calling subscriber.

If the subscriber at the distant subscriber station wishes to disconnect, power switch 9 at the subscriber station is actuated to its upper or off position. This interrupts the flow of current in conductor RS and releases relays SU and A. The release of these relays produces the same circuit action as does the start of a recall signal, described in the foregoing. Since the power switch in this case, however, is not reoperated, the cord lamp will remain steadily lighted, the ring of the cord circuit will remain open, the tip of the cord circuit will remain grounded and conductor S to Carrier Terminal 1 will remain connected to positive telegraph battery through contact 1 of relay A.

The switchboard operator may ring or re-ring the subscriber without disturbing the connection, by operating the ringing key in the cord circuit. The grounded tip of the cord circuit at contact 5 of relay A will permit circuit operations in the cord circuit which result in the application of ringing current to the ringing lead R of the cord circuit. With relay S operated and relay A released, this ringing current will pass through contact 1 of relay S, contact 3 of relay A, winding of relay B and ringing condenser RC to ground. Relay B will be operated and released at the frequency of the ringing current. The operation of relay B will establish a circuit from ground through contact 1 of relay B and the winding of relay C to battery, operating relay C. Relay C is a slow-to-release relay and remains operated throughout the ringing period. The operation of relay C by opening its contact 1 and closing its contact 2, will transfer transmission conductor S from the ring of the cord circuit to the ringing circuit, which extends through the filament of ringing lamp RL to a source of ringing current. This, in turn, will cause the ringer at the subscriber station to operate.

The subscriber at the distant subscriber station will answer the ring or re-ring by operating power switch 9 to its lower or operating position. This will restore the current in conductor RS in the subscriber toll line circuit and the circuit action will extinguish the cord lamp as an indication that the station attendant has answered.

After the subscriber has disconnected, the operator at the switchboard may disconnect by removing the plug PG2 of the answering cord from the line jack J2. The disconnection of the answering cord will perform four functions as follows:

(1) It will open the sleeve lead SL.

(2) The opening of the sleeve lead SL will release relay S.

(3) The tip lead T will be opened.

(4) The ring lead R will be opened.

The release of relay S will perform two functions as follows:

(1) It will close the circuit from the subscriber line lamp L through contact 4 of relay S. This path, however, will be opened at contact 6 of relay A.

(2) The closing of contact 3 of relay S will connect the night alarm circuit to contact 4 of relay A which is opened.

The foregoing restores the idle condition for both the subscriber toll line circuit and its cooperating cord circuit.

To originate an outgoing call or to complete an incoming call, the operator will insert the plug PG2 of her calling cord into a called subscriber line jack, such as jack J2, after making a busy test.

The operator may make a busy test of the subscriber line by touching the sleeve of the line jack with the tip of the calling plug PG2. If the line is busy, the sleeve of the line jack will be carrying a negative potential from the sleeve of the connected cord. This potential, when applied to the tip of the subsequently connected cord circuit, will light a busy test lamp in the operator's busy test circuit.

When the switchboard operator establishes a connection to a called subscriber line, the plug PG2 of the calling cord is inserted in the called subscriber line jack J2. This performs three functions as follows:

(1) It connects the sleeve lead of the cord circuit through the winding of relay S to ground. This will operate relay S and will also operate relays in the cord circuit to prepare it for subsequent ringing operations.

(2) It will connect the tip lead of the cord circuit to ground through back contact 5 of relay A.

(3) It will connect the ring lead of the cord circuit through contact 1 of relay S and the direct-current path of the ring lead will be open at contact 2 of relay A. As seen from the connected carrier channel terminal, conductor S will be terminated in positive 48-volt telegraph battery, for instance, through contact 1 of relay A and resistor RA.

The operation of relay S will perform three functions as follows:

(1) It will open the conductor of line lamp L at contact 4 of relay S.

(2) It will open the night alarm lead.

(3) It will connect the ring lead R of the cord circuit to the winding of relay B through contact 1 of relay S and contact 3 of relay A, and will remove positive battery through resistor RA from this lead by opening contact 2 of relay S.

The grounded tip lead T of the cord circuit will permit the application of ringing current to the ring lead of the cord circuit when the ringing key in the operator's position circuit is operated. It will also light the calling cord lamp and hold the calling side of the cord circuit repeater closed.

The operator may now ring the distant subscriber by operating the ringing key in the operator's position circuit. Operation of the ringing key will connect intervals of ringing current to the tip of the cord circuit and to the winding of relay B through back contact 3 of relay A. Relay B will be operated at ringing frequency through condenser RC to ground.

The operation of relay B will operate the slow-to-release relay C which wil remain operated during the ringing interval. The operation of relay C will connect ringing current to conductor S which extends into Carrier Terminal 1 and, responsively, the ringer at the subscriber station will be operated.

In the cord circuit, the operation of the ringing key will light and extinguish a ringing guard lamp, not shown, in cycles, such as, for instance, two seconds lighted and four seconds extinguished per cycle.

The subscriber at the distant station will answer the ringing by operating power switch 9 to its lower position. This will cause current to flow in conductor RS of the subscriber toll line circuit and will operate relay SU as heretofore described. At the subscriber station, the operation of power switch 9 will disconnect the ringing equipment which is normally connected to the line and connect the subscriber teletypewriter.

The operation of relay SU in the subscriber toll line circuit will operate relay A. The operation of relay A will perform three functions as follows:

(1) It will disconnect the ring lead R of the cord circuit from the winding of relay B by opening contact 3 of relay A.

(2) It will disconnect the tip lead of the cord circuit from ground by opening contact 5 of relay A.

(3) It will connect the ring conductor R to transmission conductor S by closing contact 2 of relay A.

The removal of ground from the tip lead T of the cord circuit, by the opening of contact 5 of relay A, will extinguish the ringing guard lamp circuit and prepare the ring lead of the cord circuit for transmission. The two subscribers, or the operator and either subscriber, may now communicate by teletypewriter over the ring lead of the cord circuit.

The called subscriber may recall the operator by actuating power switch 9 at the called subscriber station to its upper position and thereafter reoperating it to its lower position. The operation is the same as that described for recall by a calling subscriber in the foregoing, except that relays in the calling side of the cord are employed instead of relays in the answering side.

The called subscriber may transmit a disconnect signal to the teletypewriter switchboard by actuating power switch 9 in the subscriber station circuit at the called subscriber station to its upper position. This operation is the same as described for disconnect by a calling subscriber, except that apparatus in the calling side of the cord functions instead of apparatus in the answering side of the cord.

Transmission through the toll subscriber line circuit is carried on over conductor S and the ring lead of the cord circuit with marking current which may, for instance, be 20 milliamperes and spacing current of zero, respectively.

The transmission of break signals through this circuit in either direction is performed by interrupting current in conductor S. The break signal is transmitted through the cord circuit repeater in the conventional manner.

Attention is now called to the distinguishing characteristics between carrier terminals located at the ends of the line and carrier terminals located at intermediate points. In an arrangement, for instance, in which Carrier Terminal 1 at the switchboard is connected to Carrier Terminal 2 at the subscriber station, the signals transmitted from the switchboard toward the subscriber station and from the subscriber station toward the switchboard are converted from alternating current to direct-current signals in the receiving branch of the carrier terminal adjacent the subscriber station and the switchboard. In transmitting, the signals produced at the subscriber station and at the switchboard effect potential changes which are impressed on the sending branch of the respective carrier terminal. When carrier terminals are required to be inserted at intermediate points the direct-current signal produced in either receiving branch could not be impressed directly on the sending branch of the adjacent repeater, which is responsive to potential changes.

In the present invention, two carrier terminals located at intermediate points, Carrier Terminals 3 and 4 are interconnected back-to-back in such manner that the signals passing through the receiving branch of each may be effectively impressed on the transmitting branch of the other without the necessity for introducing a special repeater designed to convert the current signals into potential changes. How this is performed will now be explained.

Carrier Terminal 3 is in accordance with Fig. 3 and Carrier Terminal 4 is in accordance with Fig. 4. In each of these figures, the sending path and the receiving path, instead of being joined together at the input of the sending path and the output of the receiving path, as is the case in Carrier Terminal 1 and Carrier Terminal 2, are separated.

The conductor at the output of the receiving branch in each of Figs. 3 and 4 is connected to the mid-point of an individual potentiometer, and the input of the sending branch of the carrier terminal, to which the signals are to be propagated, is connected to the same junction. For this purpose two potentiometer circuits are provided, as shown in Fig. 1. One of these circuits may be traced from battery through resistor PTR1, junction J4 and resistor PTR2 to ground. The other may be traced from battery through resistor PTR3, junction J3 and resistor PTR4 to ground. Output conductor XX of Fig. 3 connects to junction J3 and input conductor ZZ of Fig. 4 connects to the same junction J3. Output conductor YY of Fig. 4 and input conductor RR of Fig. 3 similarly connect to terminal J4. The relative values of the resistors and the magnitudes and polarity of the potential of the battery connected thereto are such that the proper potentials are applied to the input circuit of the modulator drive tube 23 in Fig. 3 and Fig. 4 so that this tube in each figure is activated and cut off in response to signaling conditions applied thereto.

The cathode of sending tube 23 in each of the carrier terminals is biased by the voltage divider to a potential considerably more positive, 40 volts more positive, for instance, than the potential of the cathodes of the receiving tubes such as tubes V53 and V54 in each carrier terminal, so that, when they are arranged as are Carrier Terminals 1 and 2, in response to signals passing through the connected subscriber line or subscriber toll line circuit the voltage swings on grid 7 are centered. When connected for back-to-back operation, the received open-and-close signal currents from one terminal cause voltages to be applied to the send tube of the other terminal which are inverted and must be restored to correct polarity by operating the send switch in Figs. 3 and 4 to the LM position. When in the HM position the circuits are arranged as in Fig. 5 and Fig. 6 in which no corresponding switch is shown.

When a back-to-back connection is employed at an intermediate point, means must be provided to propagate line calling and supervisory signal conditions, generated at the subscriber's station between Carrier Terminal 3 and Carrier Terminal 4. This is performed in the following manner:

A circuit is provided which may be traced in Fig. 1 from positive battery through the winding of relay SUBB and conductor H, which extends into Fig. 3, and from the anode to the cathode of supervisory signal tube 23′ in Fig. 3 to ground. While carrier is being transmitted from the switchboard and at all times except when it is interrupted for an interval of sufficient duration, relay SUBB will be operated. When the carrier is interrupted for the transmission of a line calling or supervisory signal, relay SUBB will release opening its signal contact. While relay SUBB is operated, a circuit may be traced from positive battery in Fig. 1 through the contact of relay SUBB and conductor C which extends into Fig. 4 and through resistor R9, the anode-cathode circuit of oscillator tube 20 and resistors R3, R2 and R1 to ground. Under this condition oscillator tube 20 will oscillate. When the contact of relay SUBB is opened, oscillations in tube 20 will cease. Signals produced in the upper or transmitting branch of Carrier Terminal 4 will be transmitted to Carrier Terminal 1 and will pass through the receiving branch thereof and the subscriber toll line circuit to the switchboard in a manner which should be understood from the foregoing.

All of the signal conditions described in the foregoing which may be transmitted from a subscriber station to a teletypewriter switchboard when they are directly interconnected from a carrier terminal at the subscriber station to a carrier terminal and subscriber toll line circuit at the switchboard may, by means of the present invention, be transmitted also through an intermediate repeating point, whereat two carrier terminals are interconnected back-to-back.

The same general method as described in the foregoing for the reproduction of line calling and supervisory signals at an intermediate repeating point may be employed when two switchboards are interconnected instead of when a subscriber station is connected to a switchboard. When two switchboards are interconnected directly, it is necessary to provide two relays such as relay SUBB. The second relay SUBB would be controlled by tube 23 in Carrier Terminal 4. Its winding would be connected in series with lead TT. This relay would in turn control the oscillator in Carrier Terminal 3 in a manner which should be understood from the foregoing.

What is claimed is:

1. A telegraph system having a first, second, third and fourth carrier-current-direct-current terminating circuit, each of said circuits having means for receiving direct-current telegraph signals and translating them into alternating-current signals and vice versa, a first and a second direct-current telegraph circuit, a two-way operative telegraph channel interconnecting said first direct-current circuit, in tandem, through said first, second, third and fourth terminating circuit to said second direct-current circuit, a first potentiometer circuit in said channel interconnecting an output of said second terminating circuit to an input of said third terminating circuit, a second potentiometer circuit in said channel interconnecting an output of said third terminating circuit to an input of said second terminating circuit and means connected to each of said potentiometer circuits for translating incoming current-no-current signals into outgoing potential signals.

2. A system in accordance with claim 1, said system having means for transmitting telegraph communication signals and means for transmitting line calling signals thereover.

3. A system in accordance with claim 1, said system having means for transmitting recall signals thereover.

4. A system in accordance with claim 1, said system having means for transmitting line calling signals thereover and other means for transmitting supervisory signals thereover.

5. A first, second, third and fourth carrier-current-direct-current terminating circuit, each of said circuits having means for receiving direct-current telegraph signals and translating them into alternating-current signals and vice versa, a first and a second direct-current telegraph circuit, a two-way operative telegraph channel interconnecting said first direct-current circuit, in tandem, through said first, second, third and fourth terminating circuit in named order to said second direct-current circuit, said channel having a first potentiometer circuit interconnecting the output of a space discharge device in a receiving branch in said second terminating circuit to the input of a space discharge device in a sending branch in said third terminating circuit and a second potentiometer circuit interconnecting the output of a space discharge device in a receiving branch in said third terminating circuit to the input of a space discharge device in a sending branch in said second terminating circuit.

References Cited in the file of this patent

UNITED STATES PATENTS

| | | |
|---|---|---|
| 2,502,942 | Goodall | Apr. 4, 1950 |
| 2,770,670 | Gardner | Nov. 13, 1956 |

OTHER REFERENCES

"A New Electronic Telegraph Regenerative Repeater" by B. Ostendorf, Jr., A.I.E.E., Technical Paper 50–6, November 1949. (Copy in Division 42.)